United States Patent [19]

Sancaktar

[11] Patent Number: 4,965,119
[45] Date of Patent: Oct. 23, 1990

[54] TAPERED ROOFING TAPE

[75] Inventor: Erol Sancaktar, Potsdam, N.Y.

[73] Assignee: The Kendall Company, Boston, Mass.

[21] Appl. No.: 892,678

[22] Filed: Aug. 1, 1986

Related U.S. Application Data

[63] Continuation-in-part of Ser. No. 867,110, May 23, 1986.

[51] Int. Cl.⁵ .............................................. B32B 23/02
[52] U.S. Cl. ...................................... 428/192; 428/57; 428/58; 428/60; 428/61; 428/354; 428/355
[58] Field of Search ...................... 428/57, 60, 194, 40, 428/356, 58, 61, 192, 343, 354, 355; 156/157, 304.3, 307.6

[56] References Cited

U.S. PATENT DOCUMENTS 1,287,945 12/1918 Ford ...................................... 138/150

FOREIGN PATENT DOCUMENTS 922746 4/1963 United Kingdom .................. 428/60

Primary Examiner—Ellis P. Robinson
Assistant Examiner—P. R. Schwartz
Attorney, Agent, or Firm—Alvin Isaacs

[57] ABSTRACT

Novel two-faced roofing tape for forming a lap joint with adjacent roofing membranes wherein opposed edges of the tape are tapered.

In accordance with the preferred aspect of this invention for weatherproofing the roofs of buildings and the like, the roofing membrane is also tapered along the lap joint edge(s).

7 Claims, 3 Drawing Sheets

TAPERED ROOFING TAPE

RELATED APPLICATION

This application is a continuation-in-part of application Ser. No. 867,110 filed May 23, 1986.

BACKGROUND OF THE INVENTION

Various roof membranes are well-known in the art, the most commonly used being so-called single ply materials. In general, these single ply materials may be separated into four classes: modified bitumens; thermoplastics; elastomerics; and uncured elastomers. The modified bitumen group includes various membranes having an asphalt or coal tar content in them. They may also contain polymer additives or modifiers as well as various types of reinforcement (either within the membrane or its surface). The thermoplastic-type membranes are primarily polyvinyl chloride (PVC) or any sheet which has PVC as a principal polymer. They also include other thermoplastic polymers alloyed with PVC. The elastomers are predominantly ethylene propylene diene monomer (EPDM) with neoprene following in the order of usage. The materials are essentially thermosets or cured (or vulcanized) membranes which cannot be welded together. They can only be spliced with contact or tape adhesives. The uncured elastomers are materials which come to the roof in a thermoplastic state and can be solvent or heat welded for lap joint construction. They slowly cure or cross-link due to the sun's radiation and become elastomers in place, on the roof.

Since these general classes of roofing membranes are well-known and per se comprise no part of this invention, they need not be described in greater detail.

Generally, roof membranes can be used in four different types of roof system assemblies: loose laid/ballasted; partially adhered (or mechanically attached); fully adhered; and the protected roof membrane assembly.

Irrespective of the means of installation, where the membrane is of insufficient size to cover the roof, it will be appreciated that two or more membranes must be employed. For optimum protection against moisture and/or other environmental conditions, these multiple membranes should be seamed together. While the membranes could be butted together along adjacent edges and then sealed, the most efficacious way is to provide a lap joint wherein one edge of a membrane covers or overlaps the adjacent edge of another membrane.

The present invention relates to adhesive tapes for seaming two adjacent membranes, particularly for providing a lap joint between two adjacent membranes. Since, as mentioned earlier, EPDM and other elastomers can only be seamed or spliced with contact or tape adhesives, the invention is particularly directed to roofing membranes of this description and will accordingly be discussed hereinafter for purposes of illustration by reference thereto.

In recent years, EPDM has become very popular as a roof membrane. According to the "1984 Handbook of Single-Ply Roofing Systems", published by Harcourt Brace Jovanovich Publications, there were nineteen (19) different manufacturers offering fifty-one (51) different EPDM membranes.

By way of illustration, mention may be made of the "POLYKEN" (trademark of The Kendall Company) Roofing Systems utilizing a black EPDM 45 mils thick, having a weight/sq. ft. of 0.28 lb, and commercially available in 7, 10, 20, 30, 40 and 100 foot widths. Irrespective of the system of installation and the insulation or other substrate on which it is laid, adjacent sheets should be lap joined with a tape which of course should be two-faced.

Pressure-sensitive adhesives of known formulation are particularly suitable for this purpose, an especially useful one being a rubber-based adhesive, e.g. a butyl rubber adhesive. The tape may comprise a suitable support sheet having an adhesive layer on each surface or it may comprise a single adhesive layer of appropriate thickness, e.g. on the order of 40 mils. Preferably, a release sheet is provided on at least one surface so that the tape may be provided in roll form.

If found desirable to do so, the periphery of the membrane may be provided with a primer coat to increase cohesion with the particular tape employed. However, when employing rubber-rubber bonds, that is, when a rubber-based tape is employed with an EPDM membrane, such primer coatings have not been found to be necessary.

An EPDM membrane of the foregoing description may be installed by any of the aforementioned systems, namely, loose-laid/ballast, partial attachment, fully adhered, or by protective membrane roofing assembly, as desired. It may be employed for re-roofing or as a new roofing over various insulation materials including perlite, urethane, wood fiber, fiberglass, expanded polystyrene, composite boards, cellular glass, extruded polystyrene, and the like.

Regardless of the method of installation, a lap joint will be made with adjacent sheets. If two or more sheets of sufficient length are to be laid side by side, one lateral edge of one sheet will overlap the adjacent lateral edge of the next adjacent sheet. In like manner, if two (or more) sheets are to be laid end to end, the end portions of adjacent sheets will provide a lap joint, e.g. laying the trailing end portion of one sheet over the leading end portion of the next adjacent sheet. In any event, the lap joint will typically be on the order of at least three inches.

Following the laying of the membranes in the foregoing manner, the overlapping portion is then peeled back, a roll of the two-sided pressure-sensitive tape (typically with a release sheet on one side) is then adhered to the exposed surface of the underlying sheet edge, after which the release sheet is removed from the free surface of the tape and the top sheet is then repositioned so that the top (free) surface of the tape is adhered to the underside of the overlapping sheet, thereby completing the lap joint.

While in theory, the lap joint seal should be entirely satisfactory over a prescribed time period and under the expected or usual environmental conditions, it has been found that this is not always the case.

Specifically, it has been found that, following installation of the roofing system, environmental forces such as temperature changes and wind drag cause certain degradative changes in the lap joint.

These degradative changes are manifested as random separations or puckering along the lap joint which may be termed "fish-mouth" resulting from Poisson's effect. These fish-mouth separations permit moisture to enter, which in turn will cause rotting and/or other adverse effects on the underlying roof material.

The present invention is directed to the task of materially reducing if not obviating the fish-mouth problem so as to increase substantially the longevity of the lap joint seal and thus materially increase the time period between installation and repair of the lap joint.

BRIEF DESCRIPTION OF THE INVENTION

In accordance with the present invention, the aforementioned task is solved if opposed edges of the tape in the lap joint are tapered from the surface to be adhered to the lower membrane sheet toward the opposed surface of the tape, i.e. the surface to be adhered to the underside of the upper membrane sheet of the lap joint.

DETAILED DESCRIPTION OF THE INVENTION

As mentioned, the present invention is directed to improving the seaming together of adjacent roof membranes against degradative environmental forces, particularly improving lap joint seals when the adjacent membranes are installed in overlapping relationship, the essence of the invention being employing a sealing or seaming tape whose opposed edges are tapered rather than being the conventional perpendicular cut of the roofing tapes heretofore employed.

The aforementioned parent application Ser. No. 867,110 relates to an improved structure for adhesive tapes for wrapping metal objects, particularly pipes intended for inground implantation, which tapes comprise a substantially rectangular sheet material backing having opposed lateral edges and carrying an adhesive coating on one surface thereof, the lateral edges being tapered from the surface of the adhesive coating inwardly towards the opposed surface of the sheet material. In essence, the present invention is predicated upon the discovery that tapering a roofing tape in the manner described in the parent application will also provide significant improvements in the seaming of two adjacent water-impermeable roof membranes so as to provide a water-impermeable seal possessing markedly superior stability against degradative environmental forces, e.g. temperature change and wind drag, acting on the installed roofing system.

When two or more membranes are laid down to cover the roof area, it is customary to seal adjacent membranes together in overlapping relationship (called a "lap joint") in order to get a good protective seal which moisture cannot penetrate. A particularly efficacious way of perfecting this seal, particularly with EPDM or similar elastomer membranes is by "sandwiching" a two-faced adhesive tape between the superposed (overlapping) edges of adjacent membranes.

The conventional tapes heretofore employed for this purpose have straight or perpendicular edges which it has been found provide a void in the lamination extending along the length of the lap joint. The imperfect lamination in time permits the random occurrence of fish-mouth (resulting from Poisson's effect), which is seen visually as a "puckered" separation or delamination which can be likened to a fish mouth.

When employing a tapered tape in the lap joint in accordance with the present invention, the occurrence of this phenomenon is materially inhibited if not totally obviated during the projected life of the roofing system.

The present invention will be best understood by reference to the accompanying drawings.

Figure 1:
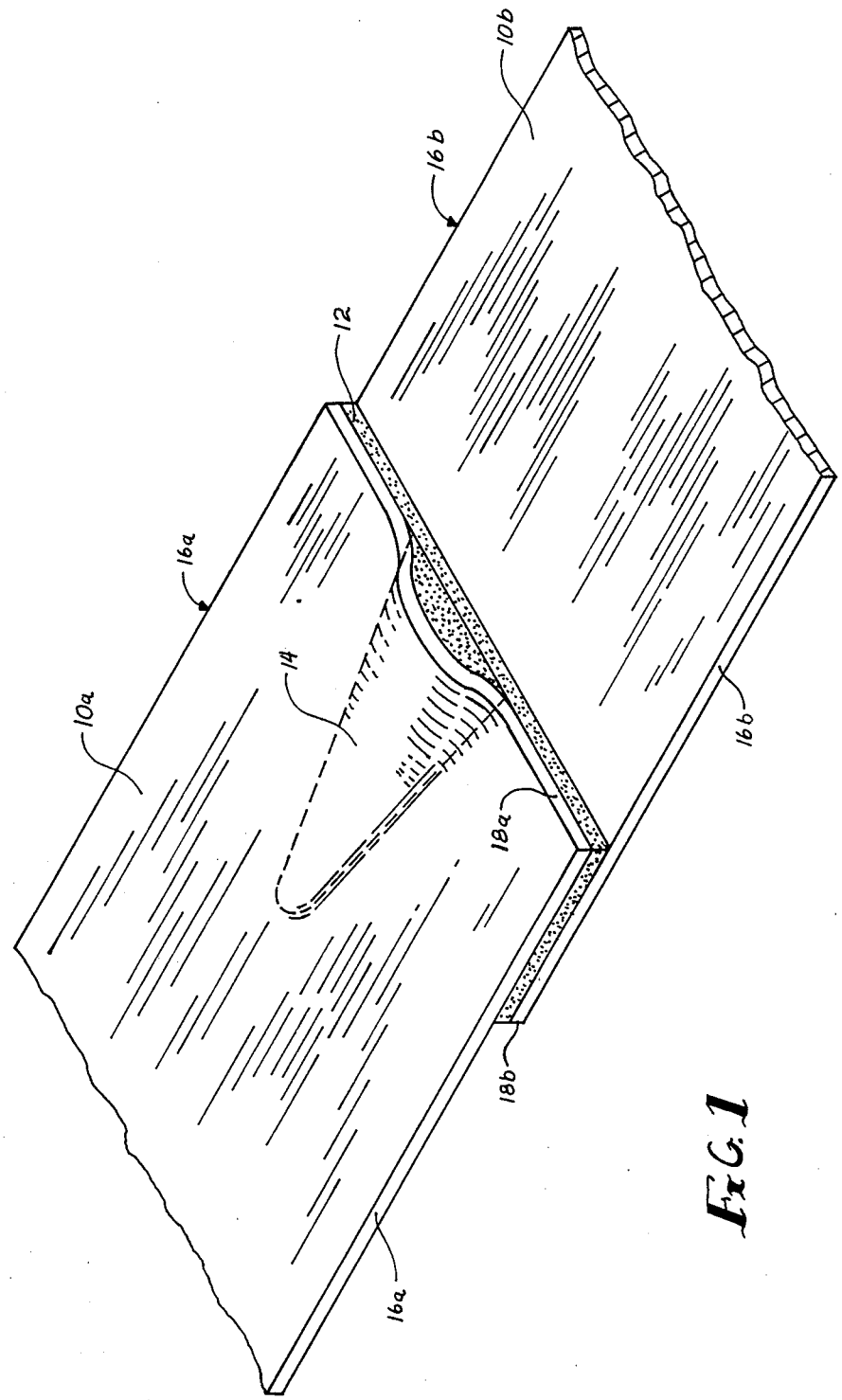
FIG. 1 is a fragmented perspective view showing the effect of environmental forces on the lap joint of two roof membranes of the prior art.

FIG. 1 illustrates a lap joint of the prior art between two membranes 10a and 10b. As shown, membrane 10a has lateral edges 16a and an end 18a; while membrane 10b has corresponding edges 16b and an end 18b. The respective ends are shown to be secured in overlapping relationship by adhesive layer 12 to provide a lap joint in the end-to-end positioning whose dimensions are defined by the width of the respective membranes and the distance between the overlapping ends, 18a and 18b.

The lower adherend 10b will deform laterally in time under the influence of Poisson's effect, whereas the upper adherend is not under this effect. Consequently, since they are bonded together, the end portion of the upper adherend wants to move with the lower adherend. However, the only way the upper adherend can move is to fold, resulting in a plurality of random "puckered" separations along the lap joint seam which are defined, because of their appearance (and the relationship to Poisson) as "fish-mouth". One such separation 14 is shown in the drawing.

In accordance with the present invention, the fish-mouth problem may be substantially reduced if not precluded entirely by tapering the lateral edges of the two-faced seaming tape rather than employing a conventional tape having perpendicular edges.

Figure 2:
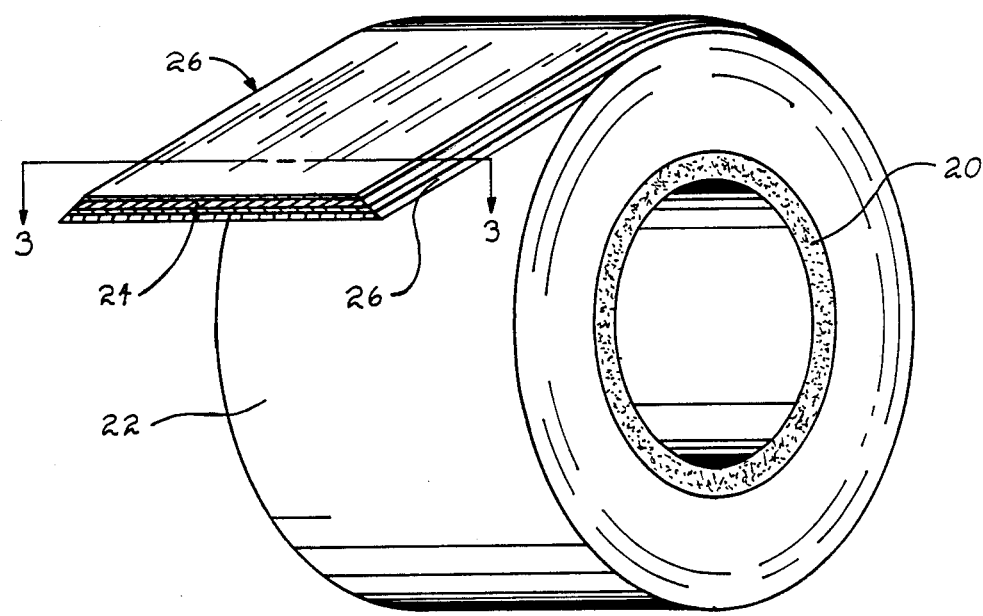
FIG. 2 is a partial perspective view of a roll of two-faced tape of this invention.

FIG. 2 illustrates a roll of the tapered roofing seam tape of this invention. As shown, the roll will comprise a central core 20 onto which is rolled a length of tape 22 having tapered opposed lateral edges 26 and a leading end 24. The trailing end (not shown) will of course be contained on the core.

Figure 3:
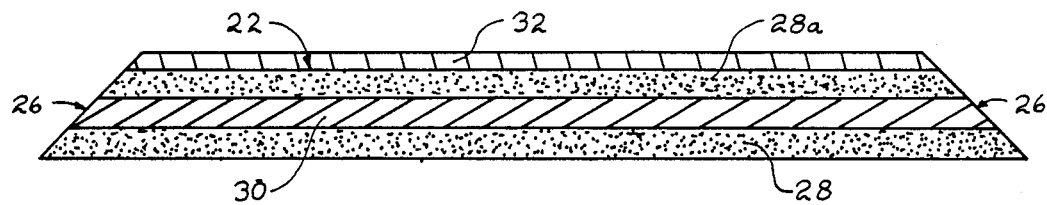
FIG. 3 is a side view showing the effect of environmental forces on a two-faced roofing membrane lap joint employing a conventional two-faced tape.

As is best seen in FIG. 3, tape 22 is shown to comprise a sheet material 26 carrying adhesive layers 28, 28a on its respective surfaces. Preferably, a release sheet 32 is provided on the outer adhesive layer 28a of the roll of tape to provide its conventional function of preventing premature adhesion to a substrate. Rolls of two-faced adhesive tape including a release sheet are of course well known in the art.

The angle of taper on the opposed lateral edges 26 should be substantially the same. This taper may be defined as diverging from the smaller adhesive surface 28a to the larger adhesive surface 28.

Figure 4:
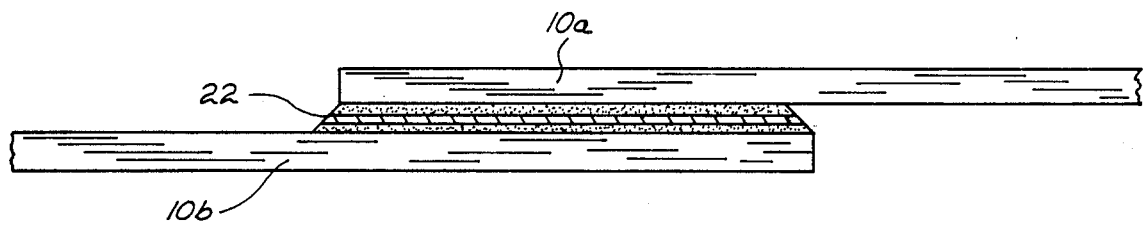
FIG. 4 is a similar view of a lap joint in accordance with this invention.

FIG. 4 is a partially diagrammatic side elevational view showing a lap joint prepared with the novel tapered two-faced seaming tape of this invention. As seen, an edge section of membrane 10a (which may be termed the "upper adherend") overlaps a corresponding edge section of membrane 10b (the "lower adherend"). The seam is provided by tape 22 extending from the side of the lap joint shown in the drawing to the opposite side (not shown) of the lap joint. The two-faced tape is positioned with the greater (wider) adhesive surface bonded to the lower adherend and the smaller (narrower) adhesive surface bonded to the upper adherend.

The adhesive tapes contemplated by this invention may be of per se known composition and dimensions. As examples of adhesives which are typically employed, mention may be made of rubber-based adhesives, acrylic adhesives, mastic compounds and the like.

Of particular interest in the practice of this invention are the butyl rubber-based adhesives which, as previously mentioned, are most useful in providing lap joints with EPDM membranes. Butyl rubber pressure sensitive adhesive formulations of this description are well known in the art and per se comprise no part of this invention.

The adhesive tape may vary in thickness and will typically be on the order of at least twenty mils thick. The width of the tape may also vary, and will generally be at least two inches.

Although the two-faced tape may be provided by coating an adhesive layer of desired thickness on both sides of a polyolefin or other suitable backing sheet, if the adhesive possesses the requisite dimensional stability, the backing sheet can be eliminated so that the tape is in the form of a monolayer of adhesive. It will of course be appreciated that in packaging, means should be provided to prevent sticking of the adhesive to itself or to any other adherend prior to use. The most efficacious way to do this is to package the tape in roll form with a release sheet engaging one surface thereof so that on unwinding, both adhesive surfaces can be protected by the release sheet.

The degree of taper which may be employed may vary. At least some beneficial results may be obtained with an angle of the taper as great as 40° to the horizontal. However, for optimum results, the degree of taper should be no greater than 22°. As will be appreciated, the minimum angle of taper is in part dependent upon the thickness of the tape. That is to say, the smallest degree of taper reasonably obtainable is directly proportional to the thickness of the tape. While this thickness, may for example vary from on the order of 5 mils to on the order of 120 mils, it would be extremely difficult if not impossible to provide a relatively small angle of taper on say, a 5 mil tape. Conversely, this would be quite easy on, say, a 120 mil thick tape. Consequently, it is not possible to state quantitatively the smallest degree of taper without stating the thickness of the tape. It can be however, be stated as a general proposition that for optimum results, the degree of taper to be employed would generally be in excess of about 10 to the horizontal. To achieve this taper, at least with conventional production equipment, tape 22 should preferably have a thickness of at least 25 mils.

The method of providing the taper is not critical. It may, for example, be provided by conventional slitting devices having a pair of knives with adjustable angle positioned on a rotatable shaft at the desired angle, as described in detail in the aforementioned parent application, Ser. No. 867,110. As described therein and shown in the accompanying illustrative drawings, a web of tape may be advanced beneath the knives onto a rotating roller provided with a series of spaced grooves. Each knife is positioned over one of these grooves preselected according to the desired width for the tape. Following the cutting or slitting operation, the cut portions of the web are advanced to a roll-up operation. The taper may also be provided during the calendering process, e.g. by employing rolls adapted to provide the desired taper.

By way of illustration, one may first apply to the roofing any of the following insulations: perlite, urethane, wood fiber, fiber glass, expanded polystyrene, composite boards, cellular glass or extruded polystyrene.

45 mils EPDM (POLYKEN Roofing Systems, as previously described) sheets of membranes are then applied thereover to cover the roof surface with a lap of, say, on the order of three inches between adjacent sheets. The membranes may be installed by per se known systems, e.g. (1) loose-laid/ballasted employing $\frac{3}{4}$ to $1\frac{1}{2}$ inch, round washed stone, 10 PSF: (2) partially attached by mechanically fastening, hex system or (3) fully adhered with Polyken bonding adhesive. A three inch Polyken LS seaming tape, a two-faced rubber-based adhesive tape on the order of 40 mils thick is then modified from the standard perpendicular edges to provide respective 20 degree tapered edges, as previously described. The tape is applied between the lapping membranes with the wider adhesive surface adhered or bonded to the lower adherend to provide lap joint seams between all lapping membranes. If needed, an uncured neoprene flashing tape should be employed to finish the roofing system.

The foregoing system should not be applied during periods of precipitation or when the temperature is beyond the range of 25° F. to 100° F.

By way of recapitulation, the present invention is directed to providing significant improvements in load-bearing capacity and/or resistance to separation of the lap joint seam by employing the described tapered seaming tapes. Since the present invention maybe regarded as modification or improvement in the physical structures of the seaming tape, it will be appreciated that the chemistry, i.e. the chemical composition of the membrane and/or seaming adhesive tape is not material. It will therefore be further appreciated that the invention is applicable to the various systems employing an adhesive tape to provide the lap joint as distinguished from the other known seaming systems, e.g. touch, hot air or solvent welding, self-sealing prefabricated seams, contact adhesives, heat fusion and the like.

My concurrently filed application, Ser. No. (892,679) described and claims novel roof membranes for providing improved lap joints with adjacent roof membranes, wherein opposed edges of the adjacent membranes for the lap joint are tapered. In the preferred embodiment of the present invention, the tapered membranes of the aforementioned copending application are employed with the tapered seaming tapes of this invention to provide still further improvements.

Since certain changes may be made without departing from the scope of the invention herein described, it is intended that all matter contained in the foregoing description, including the examples shall be taken as illustrative and not in a limiting sense.

I claim:

1. A roofing tape adapted to provide a lap joint between two lapping roof membranes, said tape comprising a sheet material having opposed lateral edges, a leading end and a trailing end and a layer of adhesive covering both surfaces between said lateral edges, each said lateral edge being tapered outwardly from the outer surface of one said adhesive layer to the outer surface of the other said adhesive layers.

2. A roofing tape as defined in claim 1 wherein the angle of taper on each said lateral edge is substantially the same diverging from one said surface to the other said surface.

3. A roofing tape as defined in claim 2 where in the angle of the taper is not greater than about 40° to the horizontal.

4. A roofing tape as defined in claim 3 wherein the angle of taper is no greater than about 22° to the horizontal.

5. A roofing tape as defined in claim 1 wherein said adhesive on each surface of said sheet material is a pressure-sensitive adhesive.

6. A roofing tape as defined ian claim 5 wherein said adhesive is a rubber-based adhesive.

7. A roofing tape as defined in claim 6 wherein said rubber-based adhesive comprising a butyl rubber.

* * * * *